(12) United States Patent
Verma

(10) Patent No.: US 10,990,442 B2
(45) Date of Patent: Apr. 27, 2021

(54) PARALLEL PROCESSING ARCHITECTURE FOR DATABASES

(71) Applicant: Bank of America Corporation, Charlotte, NC (US)

(72) Inventor: Sandeep Verma, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 225 days.

(21) Appl. No.: 16/115,660

(22) Filed: Aug. 29, 2018

(65) Prior Publication Data

US 2020/0073705 A1 Mar. 5, 2020

(51) Int. Cl.
*G06F 9/46* (2006.01)
*G06F 9/48* (2006.01)
*G06F 9/22* (2006.01)

(52) U.S. Cl.
CPC ............ *G06F 9/4881* (2013.01); *G06F 9/226* (2013.01)

(58) Field of Classification Search
CPC .............................. G06F 9/4881; G06F 9/226
See application file for complete search history.

(56) References Cited

U.S. PATENT DOCUMENTS

| | | | |
|---|---|---|---|
| 8,244,718 B2 | 8/2012 | Chamdani et al. | |
| 9,460,188 B2 | 10/2016 | Mundlapudi et al. | |
| 9,477,523 B1 | 10/2016 | Warman et al. | |
| 2004/0123087 A1* | 6/2004 | Morris | G06F 9/4405 713/1 |
| 2012/0260252 A1* | 10/2012 | Kuesel | G06F 9/4881 718/102 |
| 2015/0074662 A1* | 3/2015 | Saladi | G06F 30/33 718/1 |
| 2019/0258803 A1* | 8/2019 | Murthy | G06F 11/3684 |

* cited by examiner

*Primary Examiner* — Tammy E Lee
(74) *Attorney, Agent, or Firm* — Michael A. Springs (57) ABSTRACT

A device that includes a parsing engine and an execution engine. The parsing engine is configured to identify micro operations corresponding with operations that are common among at least two jobs from a set of jobs and to store the identified micro operations in memory. The execution engine is configured to receive a job from the set of jobs, to identity micro operations and dependencies within the job, and to execute the identified micro operations for the job in accordance with the identified dependencies.

18 Claims, 5 Drawing Sheets

PARALLEL PROCESSING ARCHITECTURE FOR DATABASES

TECHNICAL FIELD

The present disclosure relates generally to databases, and more specifically to a parallel processing architecture for databases.

BACKGROUND

Big data is a technology that organizations use to process and manage their data. Big data technology allows millions of records to be processed to generate reports and statistics for an organization. In existing systems, thousands of queries or jobs may be scheduled every day. These jobs produce reports and metrics by performing various operations (e.g. joining, sorting, or hashing) on data tables. Due to the volume of jobs that are processed, these systems execute a high volume of operations which consumes a significant amount of the system's resources such as processing power and memory. This poses a technical challenge because computer systems are resource limited and are often unable to provide enough resources to handle the volume of jobs that are processed in big data technology. In some instances, systems may resort to prioritizing jobs and executing them in order due to a lack of available resources. However, this process adds complexity and introduces latency to the system which reduces the system's throughput.

SUMMARY

The system described in the present application provides several technical advantages over existing systems which include 1) the ability to identify common operations among a set of jobs and to leverage the results from these common operations to reduce number of times operations are performed, 2) the ability to process multiple jobs simultaneously using parallel processing, and 3) the ability to automatically free up hardware resources (e.g. memory) when the results from common operations are no longer needed for processing jobs.

The system described in the present application is configured to identify common operations among a set of jobs and to store the results of the identified operations once they have been executed such that the results can be used by other jobs that have the same operations. This configuration allows the system to process jobs using previously stored operation results rather than having to execute the same operations multiple times. This process improves the operation of the system by reducing the number of operations that need to be performed when processing a set of jobs. By reducing the number of operations that need to be performed, the system reduces hardware (e.g. processor and memory) utilization. In addition, reducing the number of operations that need to be performed also reduces the amount of time it takes to process jobs which increases the throughput of the system. Thus, this process improves the operation of the system.

The system may process the jobs sequentially or in parallel. When the system is configured to process jobs sequentially, the system completes processing each job before processing the next job. When the system is configured to process jobs in parallel, the system may begin processing jobs while other jobs are concurrently being processed. In other words, the system can be configured to process multiple jobs simultaneously. Existing systems are only able to process jobs sequentially because they are unable to share operation results among multiple jobs. In contrast, because the disclosed system is able to identify common operations and reuse previously stored results, the system is able to efficiently process multiple jobs concurrently.

This configuration provides technical advantages over systems that can only process jobs sequentially. Parallel processing allows for better resource utilization and increased throughput. For example, by using parallel processing, the system can leverage multi-core, multi-threaded, and multi-processor computers having multiple processing elements within a single machine; cluster computing (composed of multiple standalone machines connected by a network); massively parallel processors (a single computer with many networked processors); symmetric multiprocessors (a computer system with multiple identical processors that share memory and connect via a bus); and grid computing (computers communicating over the Internet to work on a given problem), among others. This reduces bottlenecks in the network and the system. This increases the functionality of the system when implementing parallel job processing, and thereby improves the operation of the system.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The data warehouse described in the present application provides several technical advantages over existing systems which include 1) the ability to identify common operations among a set of jobs and to leverage the results from these common operations to reduce number of times operations are performed, 2) the ability to process multiple jobs simultaneously using parallel processing, and 3) the ability to automatically free up hardware resources (e.g. memory) when the results from common operations are no longer needed for processing jobs.

The data warehouse is configured to identify common operations among a set of jobs and to store the results of the identified operations once they are executed such that the results can be used by other jobs that have the same operations. The identified common operations are referred to as micro operations. This configuration allows the system to process jobs using previously stored operation results rather than having to execute the same operations multiple times. This process provides improves the operation of the system by reducing the number of operations that need to be performed when processing a set of jobs. By reducing the number of operations that need to be performed, the system reduces hardware (e.g. processor and memory) utilization. In addition, reducing the number of operations that need to be performed also reduces the amount of time it takes to process jobs which increases the throughput of the system. Thus, this process improves the operation of the data warehouse.

Figure 1:
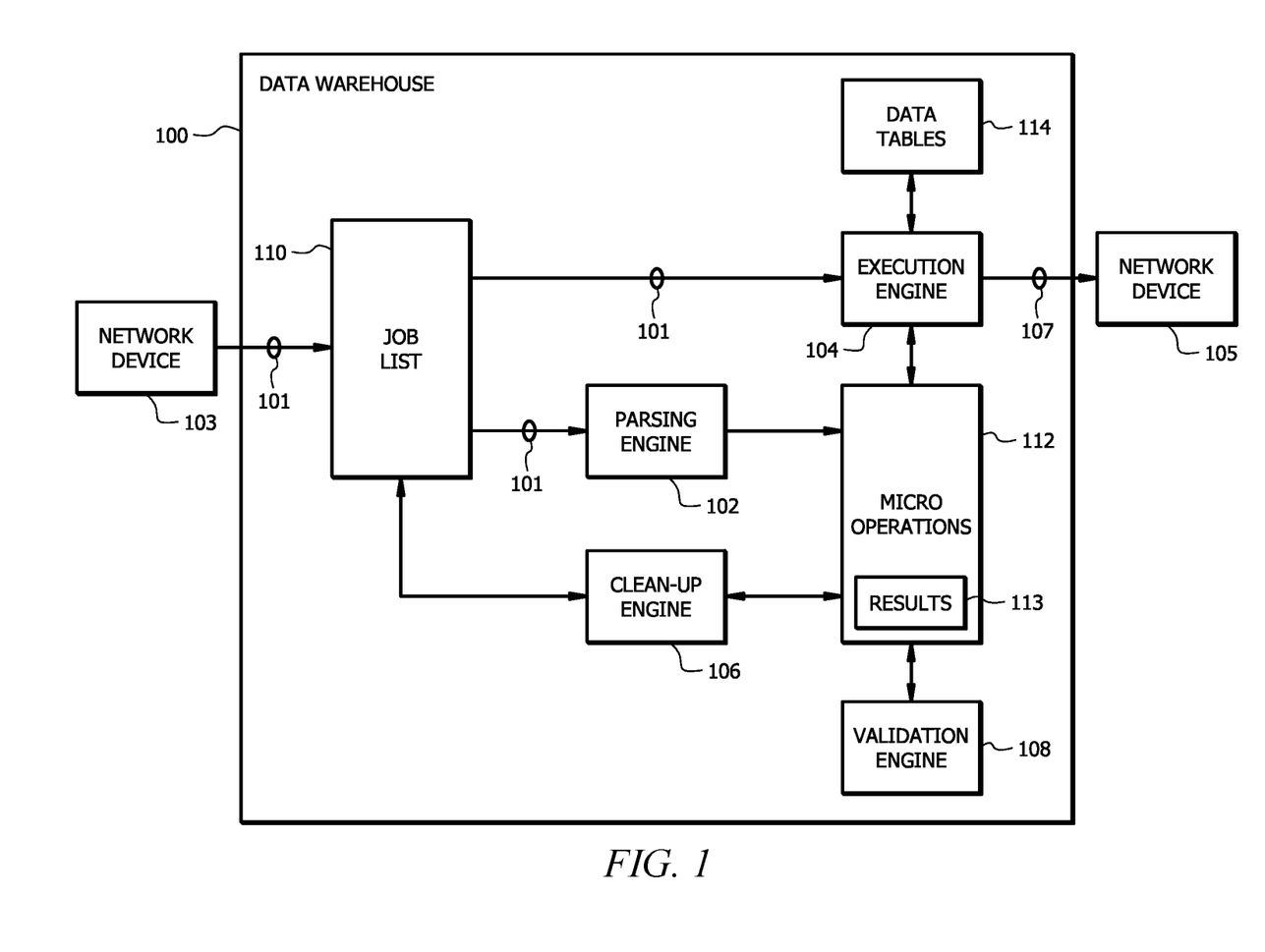
FIG. 1 is a schematic diagram of an embodiment of a job processing architecture for a data warehouse.

FIG. 1 is a schematic diagram of an embodiment of a job processing architecture for a data warehouse 100. The data warehouse 100 may be in signal communication with one or more network devices. For example, the data warehouse 100 may be configured to receive jobs 101 from a network device 103 and to store received jobs 101 into a job list 110 in memory (e.g. memory 504). The data warehouse 100 may be further configured to process the jobs 101 in the job lists 110 and to send the results or outputs 107 from processing the jobs 101 to a network device 105. In FIG. 1, network device 103 and network device 105 are shown as two different devices. In other examples, network devices 103 and 105 may be the same device. In other words, the same network device may be used to send jobs 101 to the data warehouse 100 and to receive the outputs 107 from processing the jobs 101. Examples of network devices include, but are not limited to, computers, mobile devices, servers, databases, or any other suitable type of network device.

The data warehouse 100 and the network devices may be in signal communication with each other using any suitable type of wireless or wired network including, but not limited to, all or a portion of the Internet, an Intranet, a peer-to-peer network, the public switched telephone network, a cellular network, and a satellite network. The data warehouse 100 and the network devices are configured to use any suitable type of communication protocols for communicating with each other as would be appreciated by one of ordinary skill in the art upon viewing this disclosure. The data warehouse 100 may be in signal communication with any suitable number of network devices.

Examples of the data warehouse 100 include, but are not limited to, databases, computers, servers, or any other suitable type of device. The data warehouse 100 comprises a parsing engine 102, an execution engine 104, a clean-up engine 106, and a validation engine 108. The data warehouse 100 may be configured as shown or in any other suitable configuration. Additional information about the data warehouse 100 is described in FIG. 5.

Parsing Engine

Figure 2:
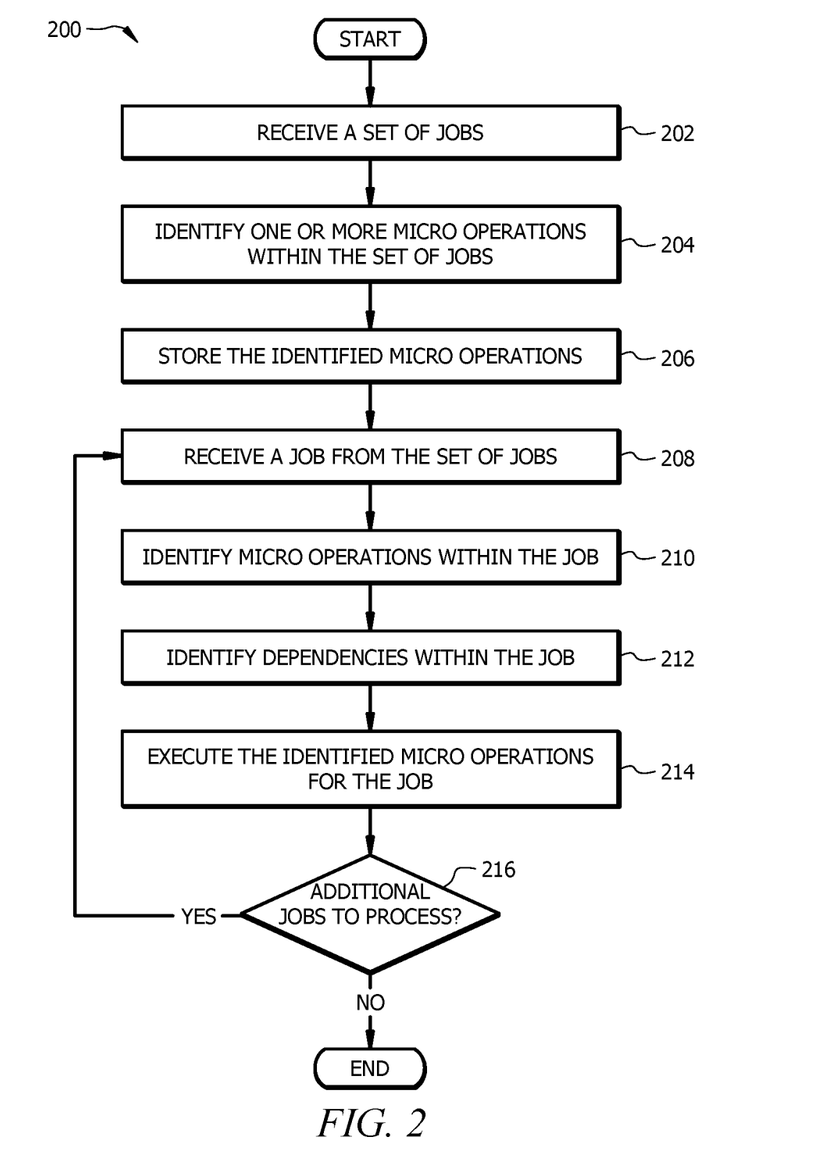
FIG. 2 is a flowchart of an embodiment of a job processing method for the data warehouse.

An example of the parsing engine 102 in operation is described in FIG. 2. The parsing engine 102 is configured to identify micro operations 112 within the set of jobs 101, and to store any identified micro operations 112 in memory (e.g. memory 504). Storing the identified micro operations 112 generates a repository of micro operations 112 that the execution engine 104 can access and use when executing jobs 101. Each job 101 comprises a series of operations that are executed to generate an output 107. Examples of outputs 107 include, but are not limited to, a new data table 114, a report, statistics, or any other suitable type of output 107 as would be appreciated by one of ordinary skill in the art. As an example, a job 101 may comprise one or more Structured Query Language (SQL) scripts that provide instructions for accessing data tables 114, performing operations on data tables 112 or data within the data tables 114, and generating an output 107 (e.g. new data table 114, a report, or statistics). In other examples, jobs 101 may be implemented in any other suitable type of format or language. A micro operation 112 is a common operation within two or more jobs 101 from among the set of jobs 101. For example, two jobs 101 may each comprise a "sort" operation that is to be performed on a particular data table 114. In this example, the parsing engine 102 identifies that the "sort" operation is common among the two jobs 101 and stores the "sort" operation in memory as a micro operation 112.

Execution Engine

An example of the execution engine 104 in operation is described in FIG. 2. The execution engine 104 is configured to receive jobs 101 from a job list 110, to identify micro operations 112 and dependencies within the jobs 101, and to execute the jobs 101. Dependencies indicate an order or sequence for executing operations and micro operations 112. For example, dependencies may identify a sequential order for executing micro operations 112 to generate an output 107. The execution engine 104 is configured to use previously stored micro operation results 113 for processing jobs 101. When previous results 113 from one or more micro operations 112 are not available, the execution engine 104 is configured to execute the micro operations 112 and store their results 113 so they can be used for processing other jobs 101. Executing jobs 101 may comprise accessing one or more data tables 114, executing operations and micro operations 112 on the data tables 114 in accordance with their dependencies, and generating an output 107. A data table is a data structure that comprises a set of data elements and identifies a relationship between the data elements. For example, a data table 114 may comprise a set of data elements grouped into rows and columns that indicate relationships between the data elements. An example of a data table 114 includes, but is not limited to, an SQL data table.

The execution engine 104 may process the jobs 101 in the job lists 110 sequentially or in parallel. When the execution engine 104 is configured to process jobs 101 sequentially, the execution engine 104 completes processing each job 101 before processing the next job 101. When the execution engine 104 is configured to process jobs 101 in parallel, the execution engine 104 may begin processing jobs 101 while other jobs 101 are concurrently being processed. In other words, the data warehouse 100 can be configured to process multiple jobs simultaneously. Existing systems only process jobs 101 sequentially because these systems are unable to share operation results 113 among multiple jobs. In contrast, because the execution engine 104 is able to identify common operations (i.e. micro operations 112) and to use previously stored results 113, the execution engine 104 is able to efficiently process multiple jobs 101 concurrently. This configuration provides technical advantages over systems that can only process jobs 101 sequentially. Parallel processing allows for better resource utilization and increased throughput. For example, by using parallel processing, the execution engine 104 can leverage multi-core, multi-threaded, and multi-processor computers having multiple processing elements within a single machine; cluster computing (composed of multiple standalone machines connected by a network); massively parallel processors (a single computer with many networked processors); symmetric multiprocessors (a computer system with multiple identical processors that share memory and connect via a bus); and grid computing (computers communicating over the Internet to work on a given problem), among others. This reduces bottlenecks in the network and the data warehouse 100. This increases the functionality of the data warehouse 100 when implementing parallel job processing, and thereby improves the operation of the data warehouse 100.

Clean-Up Engine

The clean-up engine 106 is configured to periodically remove micro operations 112 from memory when they are no longer being used by the data warehouse 100. For example, the clean-up engine 106 may be configured to access a job list 110 associated with a micro operation 112 to determine whether all the jobs 101 associated with the micro operation 112 have been executed. The clean-up engine 106 may remove the micro operation 112 from memory in response to determining that all the jobs 101 associated with the micro operation 112 have been executed. The clean-up engine 106 improves the resource utilization (e.g. memory utilization) of the data warehouse 100 by removing micro operations 112 that are no longer needed. This process frees the memory resources being used to store the micro operations 112 and their results 113, which allows these memory resources to be used for other operations. In one embodiment, the clean-up engine 106 is configured to operate in the background or in parallel with the execution engine 104. In other words, the clean-up engine 106 can remove micro operations 112 while the execution engine 104 is processing jobs 101.

Validation Engine

In one embodiment, the validation engine 108 is configured to determine that a micro operation 112 or its stored results 113 has been modified and to remove the modified micro operation 112 from memory. In another embodiment, the validation engine 108 is configured to determine that data from the set of stored data tables 114 has been modified, to identify micro operations 112 associated with the modified data table 114, and to remove the identified micro operations 112 associated with the modified data table 114 from memory. The validation engine 108 improves the resource utilization (e.g. memory utilization) of the data warehouse 100 by removing micro operations 112 that are no longer valid because either they have been modified or they are associated with modified data tables 114. This process frees the memory resources being used to store the micro operations 112 and their results 113, which allows these memory resources to be used for other operations. In one embodiment, the validation engine 108 is configured to operate in the background or in parallel with the execution engine 104. In other words, the validation engine 108 can remove micro operations 112 while the execution engine 104 is processing jobs 101.

Job Processing Flow

Figure 3:
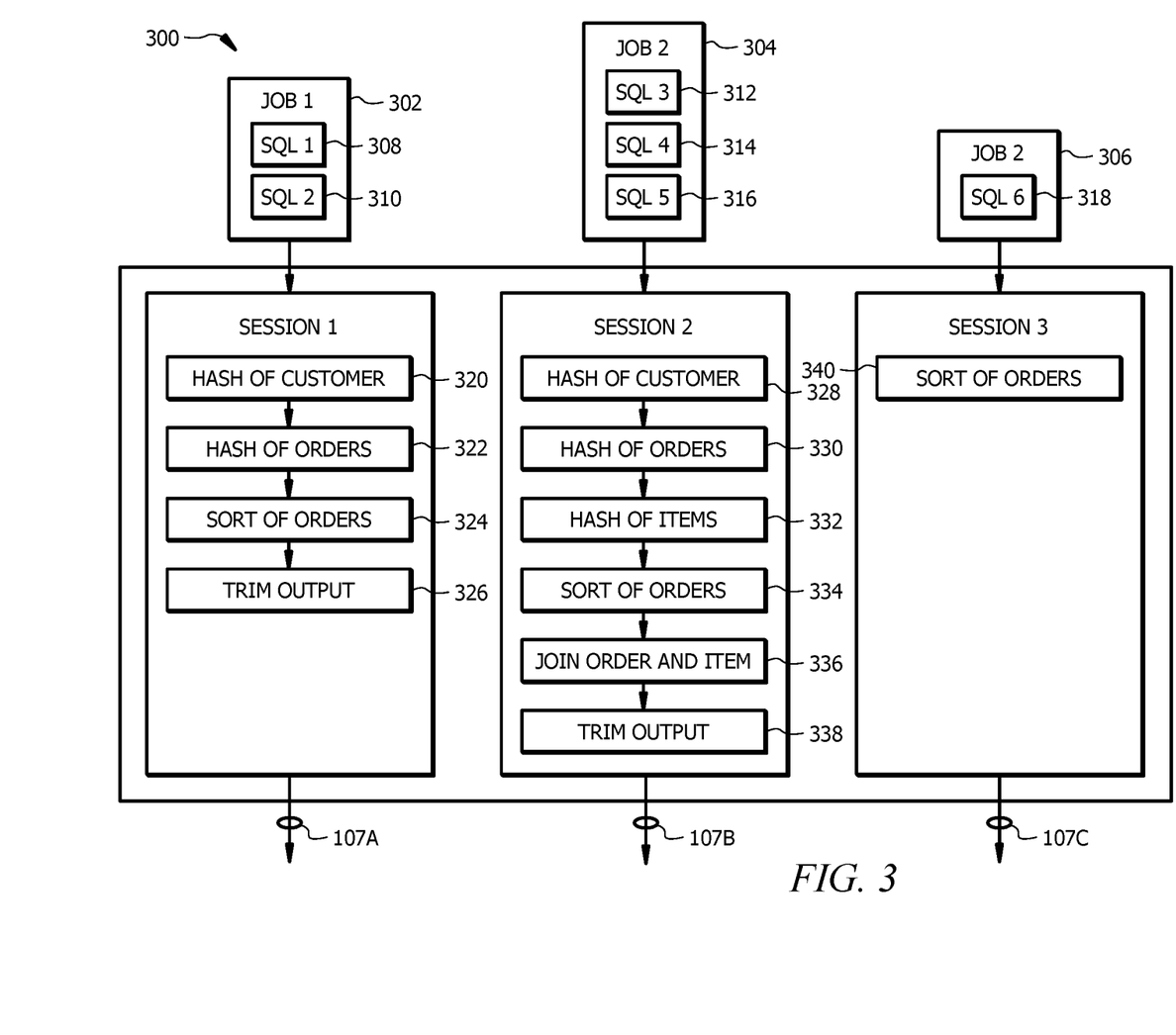
FIG. 3 is a schematic diagram of an embodiment of a first phase of job processing flow.
Figure 4:
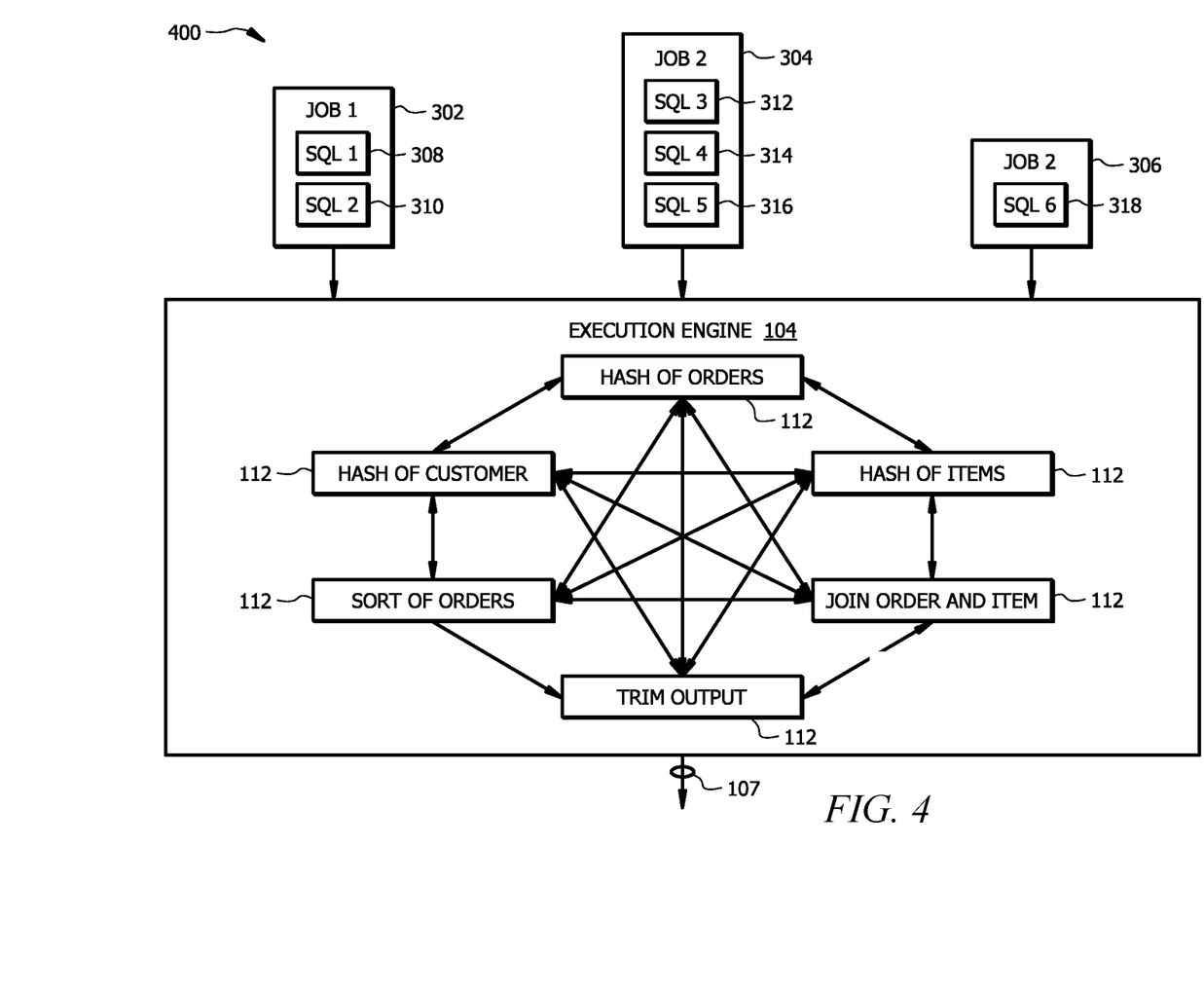
FIG. 4 is a schematic diagram of an embodiment of a second phase of a job processing flow.

FIGS. 2-4 combine to illustrate an embodiment of a job processing flow for a data warehouse 100. FIG. 2 provides an overview of a job processing method 200 for the data warehouse 100. FIGS. 3 and 4 illustrate a first phase and a second phase, respectively, of the job processing method 200 described in FIG. 2.

FIG. 2 is a flowchart of an embodiment of a job processing method 200 for the data warehouse 100. Method 200 is implemented by the data warehouse 100 to identify micro operations 112 within a set of jobs 101 and to process the jobs 101 using the identified micro operations 112. Method 200 allows the data warehouse 100 to process jobs 101 using previously stored operation results 113 rather than having to execute the same operations multiple times. In other words, once an operation is executed, the results 113 of operations are stored and used by other jobs 101 that have the same operation. This process improves the operation of the data warehouse 100 by reducing the number of operations that need to be performed when processing a set of jobs 100. By reducing the number of operations that need to be performed, the system reduces hardware (e.g. processor and memory) utilization and reduces the amount of time it takes to process jobs 101 which increases the throughput of the data warehouse 100.

At step 202, the parsing engine 102 receives a set of jobs 101. Each job 101 comprises a series of operations that are to be executed to generate an output 107 (e.g. a report). For example, a job 101 may comprise operations such as joining, sorting, or hashing which are performed on one or more data tables 114 to generate an output 107. Referring to FIG. 3, the parsing engine 102 receives a set of jobs 101 comprising a first job 302, a second job 304, and a third job 306. The first job 302 comprises a first SQL script 308 and a second SQL script 310 that define a first series of operations to be performed to generate a first output 107A. The second job 304 comprises a third SQL script 312, a fourth SQL script 314, and a fifth SQL script 316 that define a second series of operations to be performed to generate a second output 107B. The third job 306 comprises a sixth SQL script 318 that define a third series of operations to be performed to generate a third output 107C.

Returning to FIG. 2, at step 204, the parsing engine 102 identifies one or more micro operations 212 within the set of jobs 101. The parsing engine 102 may first identify the operations within each job 101 and then compare the identified operations to each other to determine whether there are any common operations among the jobs 101. As an example, referring to FIG. 3, the parsing engine 102 identifies that the first series of operations comprises a "hash of customer" operation 320, a "hash of order" operation 322, a "sort of orders" operation 324, and a "trim output" operation 326. The parsing engine 102 identifies that the second series of operations comprises a "hash of customers" operation 328 a "hash of orders" operations 330, a "hash of items" operation 332, a "sort of orders" operation 334, a "join order and item" operation 336, and a "trim output" operation 338. The parsing engine 102 identifies that the third series of operations comprises a "sort of orders" operation 340. The parsing engine 102 then compares the identified operations to determine whether any of the operations are common among at least two jobs 101 from among the first job 302, the second job 304, and the third job 306. In this example, the parsing engine 102 identifies the "hash of customer" operation, the "hash of orders" operation, the "sort orders" operation, and the "trim output" operation as micro operations 212.

Returning to FIG. 2, at step 206, the parsing engine 102 stores the identified micro operations 212 in memory (e.g. memory 504). The stored micro operations 212 can be accessed and used by the execution engine 104 to identify common operations with results 113 that can be used for processing multiple jobs 101. An example of the execution engine 104 processing a job 101 using micro operations 112 is described below in steps 208-216.

In one embodiment, storing micro operations 112 comprises associating a list of jobs 101 (e.g. job list 110) with the stored micro operations 112. For example, the parsing engine 102 may be configured to store a micro operation 112 and to store a job list 110 that identifies the jobs 101 that contain the micro operation 112. In this example, the clean-up engine 106 may use the job list 110 to periodically remove micro operations 112 from memory when they are no longer being used by the data warehouse 100.

In one embodiment, storing micro operations 112 comprises executing the micro operations 112 and storing the results 113 from executing the micro operations 112. By storing the results 113 from executing the micro operations 112 in advance, the execution engine 104 is able to use the stored results 113 to process jobs 101 rather than having to initially execute the micro operations 112. This process improves the operation of the data warehouse 100 by reducing the number of operations that need to be performed when processing a set of jobs 101.

At step 208, the execution engine 104 receives a job 101 from the set of jobs 101. For example, the execution engine 104 may access or request jobs 101 from the job list 110. As another example, the execution engine 104 may be configured to periodically receive jobs 101 from the job list 110.

At step 210, the execution engine 104 identifies micro operations 212 within the job 101. Referring to FIG. 3, the execution engine 104 may receive the first job 302 from the job list 110. The execution engine 104 identifies the operations within the first job 302 and compares the identified operations to the stored micro operations 112 to determine whether the first job 302 contains any of the previously identified micro operations 112. The execution engine 104 identifies micro operations 112 within the first job 302 when the identified operations match stored micro operations 112. In this example, the execution engine 104 identifies the "hash of customer" operation 320, the "hash of orders" operation 322, the "sort orders" operation 324, and the "trim output" operation 326 as micro operations 112 associated with the first job 302. The execution engine 104 may repeat this process each time it receives a job 101 from the job list 110.

Returning to FIG. 2, at step 212, the execution engine 104 identifies dependencies within the job 101. Dependencies indicate an order or sequence for executing operations and micro operations 112 when processing the job 101. Referring to FIG. 3, the execution engine 104 identifies dependencies for the identified operations and micro operations 112 within the first job 302. In this example, the execution engine 104 determines the order of the operations as "hash of customer" operation 320, "hash of order" operation 322, "sort of orders" operation 324, and "trim output" operation 326.

Returning to FIG. 2, at step 214, the execution engine 104 executes the identified operations and micro operations 112 in accordance with their dependencies. The execution engine 104 determines whether any of the identified micro operations 112 have been previously executed. For example, the execution engine 104 may determine that one of the identified micro operations 112 is linked with a result 113 from previously executing the micro operation 112. In response to identifying the stored micro operation result 113, the execution engine 104 will use this stored result 113 instead of executing the micro operation 112 again. This process reduces the amount of times a micro operation 112 is executed which reduces the amount of time needed for the execution engine 104 to process jobs 101 in the job list 110.

In response to determining that one or more of the micro operations 112 have not been previously executed, the execution engine 104 executes the remaining micro operation 112 and links the results 113 from executing the micro operations 112 with their corresponding micro operation 112 in memory. This process allows the results 113 from executing micro operations 112 to be stored in memory so that they can be reused for processing other jobs 101 instead of re-executing micro operations 112.

Referring to FIG. 4 as an example, the execution engine 104 may access the identified micro operations 112 and any previously stored results 113 linked with the micro operations 112 for the jobs 101 (e.g. the first job 302, the second job 304, and the third job 306) in the job lists 110. As the execution engine 104 receives each job 101, the execution engine 104 will execute the jobs 101 in accordance with their dependencies by either using previously stored results 113 or by executing the micro operations 112. The execution engine 104 may store the output 107 from executing the job 101 in memory and/or may send the output 107 to another device (e.g. network device 105).

At step 216, the execution engine 104 determines whether additional jobs 101 from the set of jobs 101 need to be processed. The execution engine 104 returns to step 208 to receive another job 101 from the set of jobs 101 for processing in response to determining that additional jobs 101 need to be processed. Otherwise, the execution engine 104 terminates method 200 in response to determining that no additional jobs 101 need to be processed.

Figure 5:
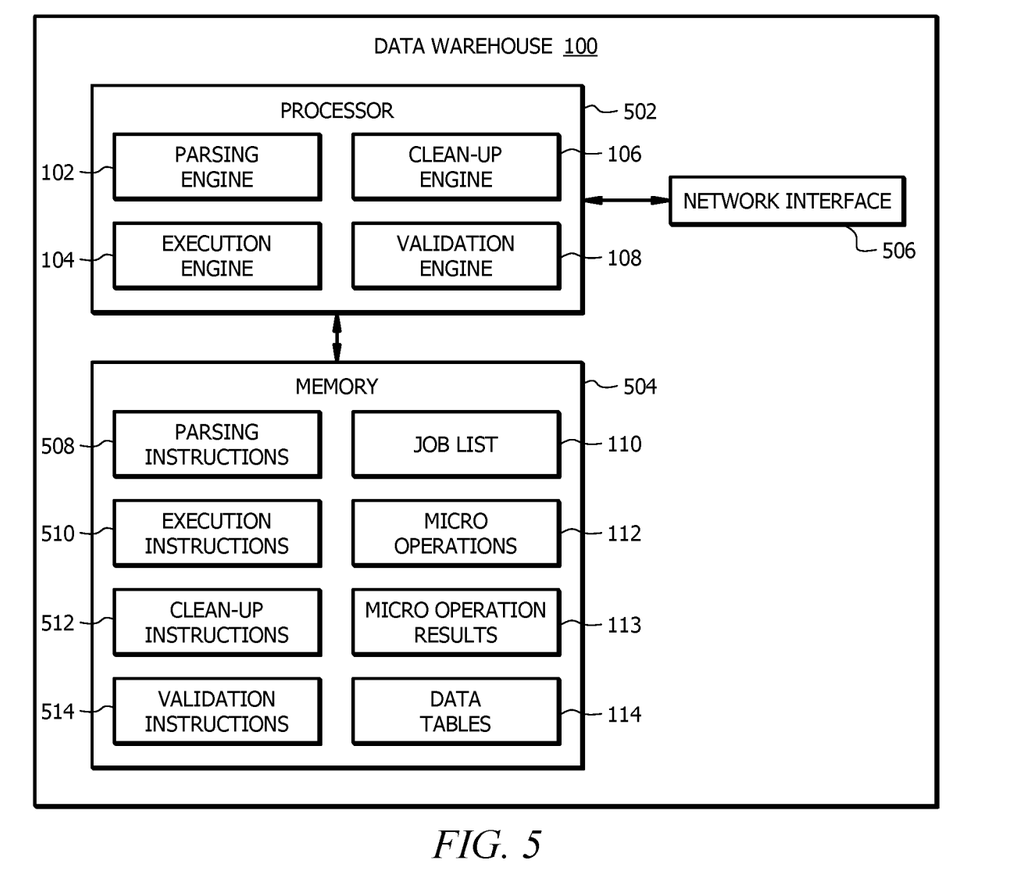
FIG. 5 is a schematic diagram of a data warehouse.

FIG. 5 is a schematic diagram of a data warehouse 100. The data warehouse 100 comprises a processor 502, a memory 504, and a network interface 506. The data warehouse 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 504. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a parsing engine 102, an execution engine 104, a clean-up engine 106, and a validation engine 108. In this way, processor 502 may be a special purpose computer designed to implement function disclosed herein. In an embodiment, the parsing engine 102, the execution engine 104, the clean-up engine 106, and the validation engine 108 are each implemented using logic units, FPGAs, ASICs, DSPs, or any other suitable hardware. The parsing engine 102, the execution engine 104, the clean-up engine 106, and the validation engine 108 are configured to operate similar to the parsing engine 102, the execution engine 104, the clean-up engine 106, and the validation engine 108 described in FIG. 1, respectively.

The memory 504 comprises one or more disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM). The memory 504 is operable to store parsing instructions 508, execution instructions 510, clean-up instructions 512, validation instructions 514, job lists 110, micro operations 112, micro operation results 113, data tables 114, and/or any other data or instructions. The parsing instructions 508, execution instructions 510, clean-up instructions 512, validation instructions 514 may comprise any suitable set of instructions, logic, rules, or code operable to execute the parsing engine 102, the execution engine 104, the clean-up engine 106, and the validation engine 108, respectively. The job lists 110, the micro operations 112, and the data tables 114 are configured similar to the job lists 110, the micro operations 112, and the data tables 114 described in FIG. 1, respectively.

The network interface 506 is configured to enable wired and/or wireless communications. The processor 502 is configured to send and receive data using the network interface 506. The network interface 506 is configured to communicate data between the data warehouse 100 and any other network devices, systems, or domains. For example, the data warehouse 100 may be in signal communication with one or more network devices (e.g. servers, databases, or computers). The data warehouse 100 may be configured to receive jobs 101 for processing and to send outputs 107 from executed jobs 101 to the network devices in signal communication with the data warehouse 100. The network interface 506 may comprise a WIFI interface, a local area network (LAN) interface, a wide area network (WAN) interface, a modem, a switch, a router, or any other suitable type of interface. The network interface 506 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A job processing device, comprising:
   a network interface configured to:
   receive a set of jobs, wherein each job comprises a series of operations; and
   send outputs from executed jobs;
   a memory operable to store:
   the set of jobs;
   a set of data tables; and
   a set of results corresponding with executed micro operations;
   a parsing engine implemented by a processor operably coupled to the network interface and the memory, configured to:
   receive the set of jobs;
   identify operations within the set of jobs;
   compare the identified operations among the set of jobs;
   identify one or more operations that are common among at least two jobs from the set of jobs;
   identify one or more micro operations that correspond with the identified one or more operations that are common among at least two jobs from the set of jobs, wherein a micro operation from among the identified one or more micro operations is a common operation among two or more jobs from the set of jobs;
   store the identified micro operations;
   an execution engine implemented by the processor, configured to:
   receive a job from among the set of jobs;
   identify a series of operations associated with the job;
   compare operations from the series of operations to the stored micro operations;
   identity one or more micro operations within the series of operations based on the comparison;
   identify dependencies within the series of operations, wherein a dependency indicates an order for executing the series of operations; and
   execute the identified micro operations for the job in accordance with the identified dependencies; and
   a validation engine implemented by the processor, configured to:
   determine that a data table from the set of data tables has been modified;
   determine that a first micro operation of the stored micro operations is associated with performing an operation on the data table that has been modified; and
   remove the first micro operation and results of the first micro operation from the memory in response to determining that the first micro operation is associated with performing the operation on the data table that has been modified.

2. The device of claim 1, wherein executing the identified micro operations comprises:
   determining whether a result associated with an identified micro operation is present in the memory;
   using the result associated with the identified micro operation in response to determining that the result associated with the identified micro operation is present in the memory; and
   executing the identified micro operation in response to determining that the result associated with the identified micro operation is not present in the memory.

3. The device of claim 1, wherein the execution engine is configured to process two or more jobs from the set of jobs simultaneously.

4. The device of claim 1, wherein storing micro operations comprises:
   executing a micro operation from among the identified micro operations; and
   storing a result associated with executing the micro operation.

5. The device of claim 1, further comprising:
storing a result associated with executing a micro operation in memory in response to executing the micro operation.

6. The device of claim 1, wherein storing micro operations comprises associating a list of jobs containing a micro operation, and
further comprising a clean-up engine implemented by the processor, configured to:
determine that all of the jobs in the list of jobs have been executed; and
remove the micro operation from the memory in response to the determination.

7. The device of claim 1, wherein the validation engine is further configured to:
determine that a result associated with a micro operation in the set of stored micro operations has been modified; and
remove the micro operation associated with the modified result from memory in response to the determination.

8. A job processing method, comprising:
receiving, at a parsing engine implemented by a processor, a set of jobs wherein each job comprises a series of operations;
identifying, by the parsing engine, operations from among the series of operations for each job;
comparing, by the parsing engine, the identified operations among the set of jobs;
identifying, by the parsing engine, one or more operations that are common among at least two jobs from the set of jobs;
identifying, by the parsing engine, one or more micro operations that correspond with the identified one or more operations that are common among at least two jobs from the set of jobs, wherein a micro operation from among the identified one or more micro operations is a common operation within two or more jobs from the set of jobs;
storing, by the parsing engine, the identified micro operations into a memory;
receiving, by an execution engine implemented by the processor, a job from among the set of jobs;
identifying, by the execution engine, a series of operations associated with the job;
comparing, by the execution engine, operations from the series of operations to the stored micro operations;
identifying, by the execution engine, one or more micro operations within the series of operations based on the comparison;
identifying, by the execution engine, dependencies within the series of operations, wherein a dependency indicates an order for executing the series of operations;
executing, by the execution engine, the identified micro operations for the job in accordance with the identified dependencies;
determining, by a validation engine implemented by the processor, that a data table has been modified;
determining, by the validation engine, that a first micro operation of the stored micro operations is associated with performing an operation on the data table that has been modified; and
removing, by the validation engine, the first micro operation and results of the first micro operation from the memory in response to determining that the first micro operation is associated with performing the operation on the data table that has been modified.

9. The method of claim 8, wherein executing the identified micro operations comprises:
determining whether a result associated with an identified micro operation is present in the memory;
using the result associated with the identified micro operation in response to determining that the result associated with the identified micro operation is present in the memory; and
executing the identified micro operation in response to determining that the result associated with the identified micro operation is not present in the memory.

10. The method of claim 8, wherein the execution engine processes two or more jobs from the set of jobs simultaneously.

11. The method of claim 8, wherein storing micro operations comprises:
executing a micro operation from among the identified micro operations; and
storing a result associated with executing the micro operation in the memory.

12. The method of claim 8, further comprising:
storing a result associated with executing a micro operation in memory in response to executing the micro operation.

13. The method of claim 8, wherein storing micro operations comprises associating a list of jobs containing a micro operation, and
further comprising:
determining, by a clean-up engine implemented by the processor, that all of the jobs in the list of jobs have been executed; and
removing, by the clean-up engine, the micro operation from the memory in response to the determination.

14. The method of claim 8, further comprising:
determining, by the validation engine, that a result associated with a micro operation in the set of stored micro operations has been modified; and
removing, by the validation engine, the micro operation associated with the modified result from memory in response to the determination.

15. A job processing system, comprising:
a network device configured to:
send a set of jobs, wherein each job comprises a series of operations; and
receive outputs from executed jobs; and
a data warehouse in signal communication with the network device, comprising:
a memory operable to store:
the set of jobs; and
a set of results corresponding with executed micro operations;
a parsing engine implemented by a processor operably coupled to the memory, configured to:
receive the set of jobs;
identify operations within the set of jobs;
compare the identified operations among the set of jobs;
identify one or more operations that are common among at least two jobs from the set of jobs;
identify one or more micro operations that correspond with the identified one or more operations that are common among at least two jobs from the set of jobs, wherein a micro operation from among the identified one or more micro operations is a common operation among two or more jobs from the set of jobs;

store the identified micro operations;
an execution engine implemented by the processor, configured to:
  receive a job from among the set of jobs;
  identify a series of operations associated with the job;
  compare operations from the series of operations to the stored micro operations;
  identity one or more micro operations within the series of operations based on the comparison;
  identify dependencies within the series of operations, wherein a dependency indicates an order for executing the series of operations; and
  execute the identified micro operations for the job in accordance with the identified dependencies; and
a validation engine implemented by the processor, configured to:
  determine that a data table from the set of data tables has been modified;
  determine that a first micro operation of the stored micro operations is associated with performing an operation on the data table that has been modified; and
  remove the first micro operation and results of the first micro operation from the memory in response to determining that the first micro operation is associated with performing the operation on the data table that has been modified.

16. The system of claim 15, wherein executing the identified micro operations comprises:
  determining whether a result associated with an identified micro operation is present in the memory;
  using the result associated with the identified micro operation in response to determining that the result associated with the identified micro operation is present in the memory; and
  executing the identified micro operation in response to determining that the result associated with the identified micro operation is not present in the memory.

17. The system of claim 15, wherein the execution engine is configured to process two or more jobs from the set of jobs simultaneously.

18. The system of claim 15, wherein storing micro operations comprises:
  executing a micro operation from among the identified micro operations; and
  storing a result associated with executing the micro operation.

* * * * *